UNITED STATES PATENT OFFICE.

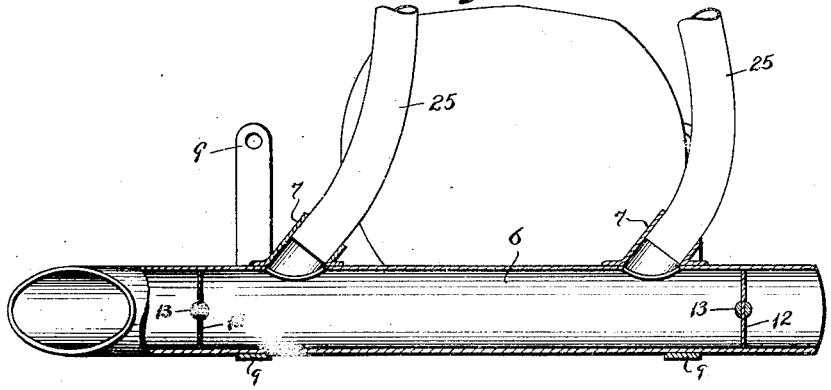
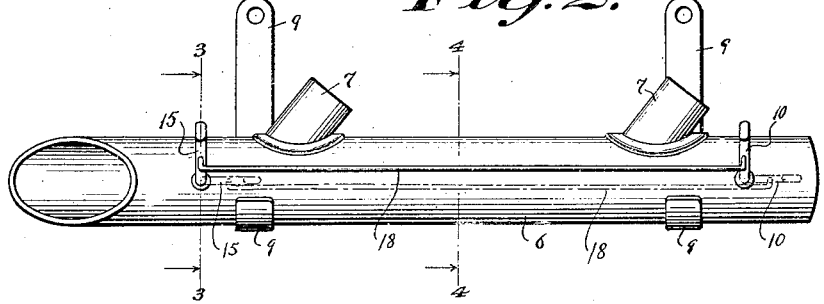
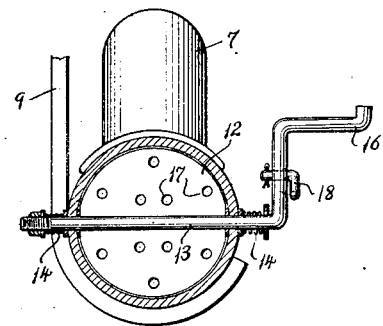
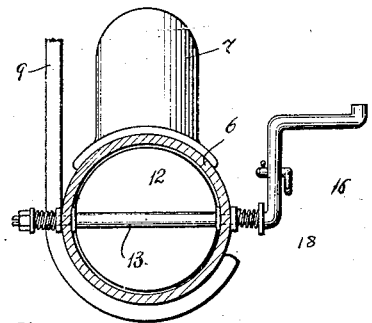
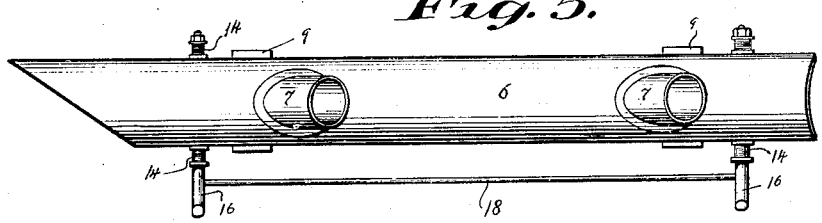

HAMILTON MERCER WRIGHT, JR., OF NEW ROCHELLE, NEW YORK.

GAS-ENGINE CUT-OUT MUFFLER.

1,375,621.  Specification of Letters Patent.  Patented Apr. 19, 1921.

Application filed June 28, 1919. Serial No. 307,363.

*To all whom it may concern:*

Be it known that I, HAMILTON M. WRIGHT, Jr., a citizen of the United States, and a resident of New Rochelle, county of Westchester, and State of New York, have invented a new and Improved Gas-Engine Cut-Out Muffler, of which the following is a full, clear, and exact description.

This invention relates to internal combustion motor cut-outs, mufflers, and the like. More particularly the invention relates to a motorcycle cut-out especially adapted for use in connection with two cylinder or twin cylinder motorcycle engines.

An object of the invention is to provide a gas engine cut-out, such as a motorcycle or automobile engine cut-out and muffler, which may readily be attached to a motorcycle or other internal combustion motor vehicle.

A particular object of this invention is to provide a muffler cut-out for motorcycles which may be installed to replace the ordinary type of muffler usually employed on said motorcycles.

It is a further object of the invention to provide a muffler cut-out fitted with double cut-out means. It is also an object to disclose the design of a twin cylinder motorcycle cut-out especially adapted to be fitted to a twin cylinder motor so that the exhaust from the two cylinders may be simultaneously discharged directly to the air but through an enlarged muffler tube to reduce, in part, the noise incident to the exhaust.

With the above principal objects in view, the invention has relation to a certain combination and arrangement of parts, an example of which is portrayed in the following description, illustrated in the accompanying drawings, and specifically pointed out in the appended claims.

In the accompanying drawings, the Figure 1 illustrates a partial longitudinal sectional view of the muffler cut-out shown in connection with twin exhaust muffler tubes, and Fig. 2 illustrates a plain elevational view of the cut-out shown detached from the exhaust manifold tubes.

Figs. 3 and 4 respectively show cross-sectional views of Fig. 2, the sections being taken upon the respective lines 3—3 and 4—4.

Fig. 5 shows a plan view of the motorcycle engine muffler cut-out.

Referring now more in particular to the drawings, the numeral 6 designates a muffler tube of appropriate length and diameter open at each end thereof. To this muffler tube is fitted a pair of manifold fittings 7. The manifold fittings are brazed, welded or otherwise fixed to the openings in the wall of the muffler tube. These fittings are provided for the purpose of connecting up the muffler tube with the twin exhaust manifold pipes which lead to the respective cylinders of the engine. In order to provide means for installing the device upon an engine, or motorcycle, one or more attachment brackets 9 are riveted, brazed, or otherwise secured to the exterior surface of the muffler tube.

A butterfly valve is pivotally mounted adjacent each open end of the muffler tube. Each valve comprises a closure vane 12 fixed upon a shaft, or inserted in a slotted shaft 13. The shaft is journaled in holes formed in the muffler tube. One end of the shaft projects through the muffler tube and has confined thereupon a compression spring 14. A washer and nut is mounted on the end of the shaft extension to compress the spring. The other end of the shaft is fitted with a spring, washer and nut to frictionally engage the tube 6 to prevent turning of the shaft 13. An upturned foot piece or crank 15 with a handle is made on the shaft to operate the butterfly valves. The two springs 14 act to frictionally engage the washers which hold the spring in compression so as to constrain the butterfly valve from movement, and so as to hold said valve in any set position. Each butterfly valve is similar in design to the valve just described, each valve being provided with a footpiece. The rear crank is designated by the numeral 15, while the forward crank is designated by the numeral 10. It will be preferable to punch a plurality of gas emitting holes 17 in one or both of the butterfly valves so as to permit the exhaust gases from the engine to pass outwardly from the muffler tube when both valves are in closed position. The butterfly valves are mounted in the muffler tube forward of each manifold fitting 7 so that the exhaust gases pass into the closed tube. A link 18 has each end thereof pivotally connected with the foot pieces 10 and 15. Fig. 3 shows the rear cut-out valve perforated with the front valve solid.

This muffler cut-out device is installed on a motorcycle by attaching the brackets 9 to the motorcycle frame in places usually provided. The exhaust tubes 25 are inserted in each manifold fitting 7 with the upper ends thereof connected to each cylinder of the motorcycle engine so as to transmit the exhaust from each cylinder downwardly to the muffler tube.

The rider can conveniently manipulate one footpiece thereby simultaneously opening or closing the butterfly valves 12. On some motorcycles there is usually employed footboards which are located over the muffler and muffler cut-out. The foot-board usually covers the forward end of the muffler tube, and in this case the footpiece 10 would not be accessible to the rider's foot, and, therefore, could not be easily opened or closed. The foot boards are usually comparatively short in length which causes the muffler tube to extend rearwardly therefrom and be exposed so that the footpiece 15 would be accessible to the rider's foot. When the muffler tube is installed on a motorcycle with footboards, as described, the rider will have access to either one or the other of the control footpieces 10 or 15 so as to open or close the valve, thereby permitting free exhaust from the engine cylinders to the atmosphere.

This muffler exhaust tube and cut-out means may be adjusted partially open or fully open according to the desire of the rider. Its use will be pleasing to the motorcycle rider and beneficial to the operation of the engine in that the tube will, in a manner, tone down the high sounding exhaust vibrations yet permit the engine to have free and unimpeded exhaust passage to atmosphere.

This form of motorcycle exhaust cut-out will be found beneficial on road races, hill climbing contests and other competitive motorcycle events.

Having thus described my invention, what I claim as new, and desire to secure by Letters-Patent is:

1. An internal combustion motor cut-out comprising; a muffler open at each end, muffler fittings attached thereto, and butterfly valves pivotally confined in the muffler tube adapted to be simultaneously opened.

2. An internal combustion motor cut-out comprising; a muffler open at each end, muffler fittings attached thereto, butterfly valves pivotally confined in the muffler tube adapted to be simultaneously opened, and a footpiece employed to simultaneously open both valves.

3. An internal combustion motor cut-out comprising; a muffler tube open at each end thereof, with butterfly valves pivotally mounted within said muffler tube, footpieces associated with each butterfly valve, and a connecting link joining the butterfly valves together so said valves may be simultaneously opened or closed.

4. An internal combustion motor cut-out comprising; a muffler having unrestricted open ends, and muffler fittings attached thereto, and butterfly valves pivotally confined in each end of the muffler tube adapted to be simultaneously opened.

5. A combination internal combustion motor cut-out and a muffler comprising; a muffler tube having unrestricted openings at each end, a butterfly valve pivotally confined in the muffler tube adjacent each open end, a crank or foot piece attached to each butterfly valve to open and close same, a link connecting the two foot pieces so that both valves may be simultaneously opened or closed by manipulating one of the foot pieces.

6. A combination internal combustion motor cut-out and a muffler comprising; a muffler tube having unrestricted openings at each end, a butterfly valve pivotally confined in the muffler tube adjacent each open end, a crank or foot piece attached to each butterfly valve to open and close same, a link connecting the two foot pieces so that both valves may be simultaneously opened or closed by manipulating one of the foot pieces, and a coil compression spring related with the foot piece to exert pressure on the butterfly valve to hold it in set position.

HAMILTON MERCER WRIGHT, Jr.